United States Patent [19]

Lundahl et al.

[11] Patent Number: 4,896,486
[45] Date of Patent: Jan. 30, 1990

[54] CROP HARVESTER HAVING HEIGHT CONTROL

[75] Inventors: E. Cordell Lundahl, Providence; Laurel H. Jensen, Hyrum, both of Utah

[73] Assignee: Lundahl Research, Inc., Logan, Utah

[21] Appl. No.: 203,778

[22] Filed: Jun. 7, 1988

[51] Int. Cl.⁴ .......................................... A01D 75/28
[52] U.S. Cl. ................................ 56/10.2; 56/DIG. 15
[58] Field of Search ............... 56/10.2, DIG. 15, 208, 56/10.1; 172/4

[56] References Cited

U.S. PATENT DOCUMENTS

| | | | |
|---|---|---|---|
| 3,906,710 | 9/1975 | Pask | 56/10.2 |
| 4,228,636 | 10/1980 | Homburg | 56/10.2 |
| 4,414,792 | 11/1983 | Bettencourt et al. | 56/10.2 |
| 4,507,910 | 4/1985 | Thornley et al. | 56/10.2 |
| 4,573,124 | 2/1986 | Seiferling | 56/10.2 X |

*Primary Examiner*—Thuy M. Bui
*Assistant Examiner*—Matthew Smith
*Attorney, Agent, or Firm*—Henderson & Sturm

[57] ABSTRACT

A threshing unit including a header having a stripping unit for stripping the grain from the stalks as the unit moves in the field. The threshing unit has height control to accurately position the stripping units at the heights of the heads of grain on the stalk. The grain head is positioned by air flow (for stripping) and the grains is carried into a cleaning unit and then into a combination re-thresher cleaner unit by air flow and centrifugal force. The cleaning is done by air flow and the transport of the grain to an attached or mobile container is accomplished by air flow.

43 Claims, 5 Drawing Sheets

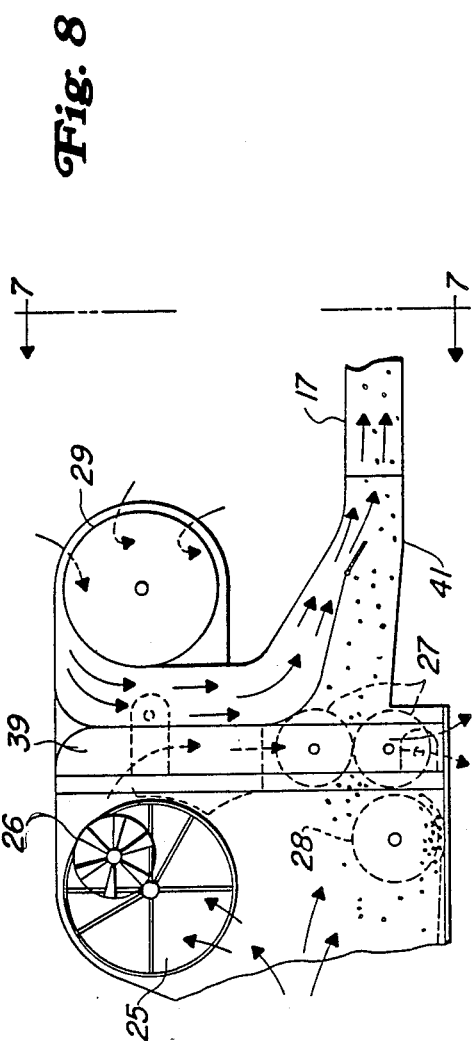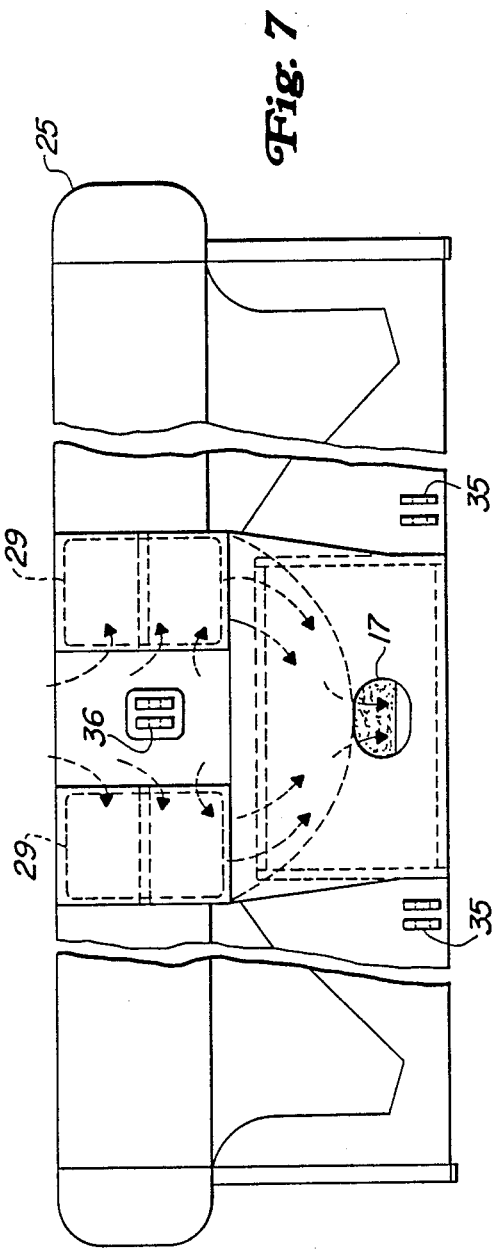

CROP HARVESTER HAVING HEIGHT CONTROL

BACKGROUND OF THE INVENTION

The present invention relates primarily to means for harvesting standing crops growing in the field and having a head at the top of the stalk such as wheat. In particular, the present invention relates to a system for combining or stripping the grain from the stalk leaving the stalk substantially in the field and performing cleaning operations on the grain after stripping before depositing in a grain wagon for departure from the field. Harvesting of standing crops by fingers, drums and brushes has been attempted for many years and is shown in various forms in the prior art. One such combine is shown in my U.S. Pat. No. 4,738,087 . Similar harvesters are shown in U.S. Pat. Nos. 3,184,904; 2,853,845 and 2,547,749. In the prior art there has not been any system which has been a commercial success because grain losses are high and the harvested grain still has been sent through the regular combine apparatus to clean and continue the separation of the grain from the chaff and straw. Part of the reason for this lack of success was that the prior art strippers did not strip only the area of the heads as they sat upon the stalk but rather stripped too much of the stalk. This was partly due to the fact the header was not accurately positioned to limit its stripping action to the area of the heads An important improvement was my U.S. Pat. No. 4,507,910 which had an automatic sonar height control for headers. However, this invention improved the placement of the header but only had the known top stripping action which did not necessarily reach all of the grains as they existed on the head at the top of the stalk. This present invention provides for the control of a plurality of stripping means for threshing of the grain from the stalk. By utilizing two heads or two stripping means, it is possible to strip almost all the grain from the straw forming the stalks. The two stripping actions may be and are confined to the area on the stalk which contains the heads and do not attack or remove any of the straw from the field. This invention in addition provides for a novel stripping means. The auger stripper with v-shaped notches or wedges cut in the flighting provides the improvement in stripping by having impact for shattering the heads to remove the grain from the stalk plus having a pulling action which will assist in removing the head and the grain from the stalks. The prior art has also been plagued by the problem of providing a means of transporting the grain from the stripper to the carrying means. This has normally been done by sending the grain through the separator and cleaner of a combine and then into the grain tank of the combine This was also believed necessary in the prior art in order to clean the grain and to ensure adequate separation of all of the grain. This invention has an air flow system which improves the separation of the grain from the stalk at the point of stripping and provides for cleaning after stripping and also provides the transport means for transporting the grain which has been removed from the stalk to the cart or carrying mechanism for storing the grain to remove it from the field.

SUMMARY OF THE INVENTION

It is therefore a principal object of the present invention to provide a crop harvesting combine including control system and a threshing system which permits the stripping threshing concept the most precise contact with the grain heads of the crop to be harvested. In particular, it is an object of this invention to provide a harvesting system which will harvest the standing grain crop with particular attention to the stripping of the grain by the use of a heighth control system, stripping system and an air flow system that in combination provides a total threshing and improved cleaning system for small grains. This and additional objects of the present invention are achieved by providing an automatic heighth control system applied to a two stripper concept which ensures that the upper and lower stripper are operating strictly within the grain head area. This also ensures that the total crop is stripped from the stalk as the combine proceeds down the field. The crop harvesting system lso employs an air flow that forces the stalks of the standing crop into positive contact with the stripping mechanisms. The system utilizes the exhaust air both from the air flow system and the action of the stripper's rotation. This total air flow takes the waste material, i e., chaff and straw to a cleaning mechanism where the waste material can be removed and deposited on the ground. A second air system is utilized to assist in the movement of the grain and heads removed from the straw stalks through a second threshing system and then to carry the grain from the second threshing system to a depository location. The stripping mechanism employed in one embodiment of this invention is also a novel threshing system. This stripping mechanism is an auger having a flighting which flighting is directed toward the middle and is in two parts and having v-shaped wedges in the flighting. These v-shaped wedges are able to provide positive separation of the grain from the stalks by both impact and a stripping action at the apex of the v shape. The positioning of the header of this harvesting system is achieved by hydraulics responding to the sonar sensors and to the height sensing system for positioning the stripping mechanisms accurately with respect to the grain head's position on the stalk of the growing grain. Additional features and objects and objectives of the present invention will become apparent from the following detailed description taken together with the accompanying drawings.

THE DRAWINGS

FIG. 7 is a cross-sectional view of FIG. 8; the plane of which is indicated by lines 7—7.

FIG. 8 is a schematic diagram illustrating the air flow around the cleaning system and the air flow of the transporting system.

DESCRIPTION OF THE PREFERRED EMBODIMENT

In accordance with the present invention, an agricultural vehicle such as the windrower is provided with a header unit. The header unit comprises a complete threshing element. The system includes automatic height controls to control the header with respect to the ground surface and the top of the crop immediately ahead of the combine unit. A diagramatic view of a typical windrower having a header unit with the teachings of this invention is attached to the front end as shown in FIG. 1.

Figure 1:
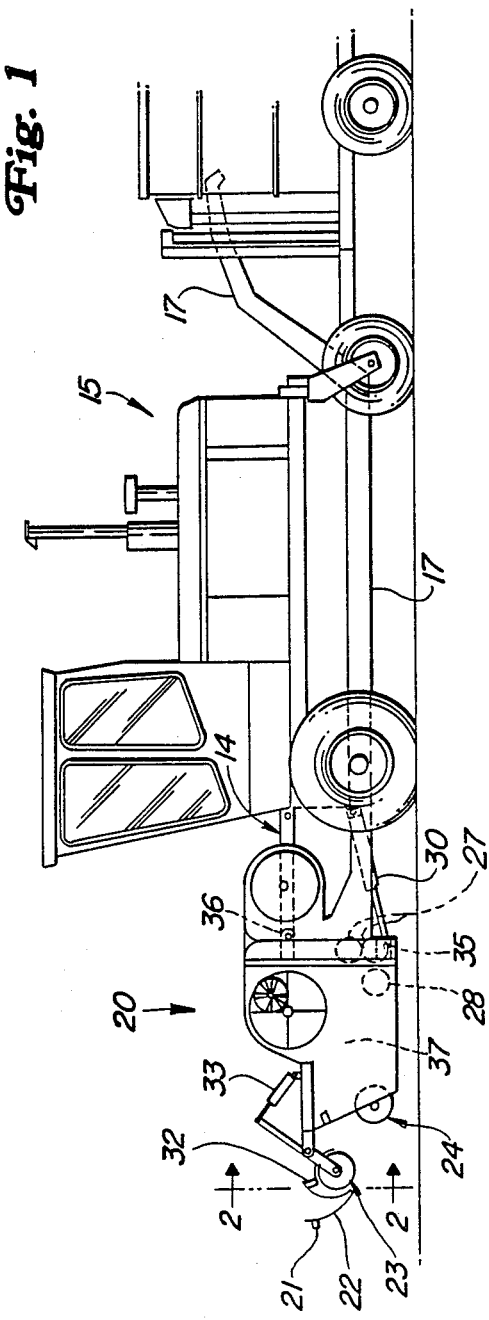
FIG. 1 is a diagrammatic left hand view of the invention mounted on a farm implement for transport with header combined of the present invention mounted thereon.
Figure 2:
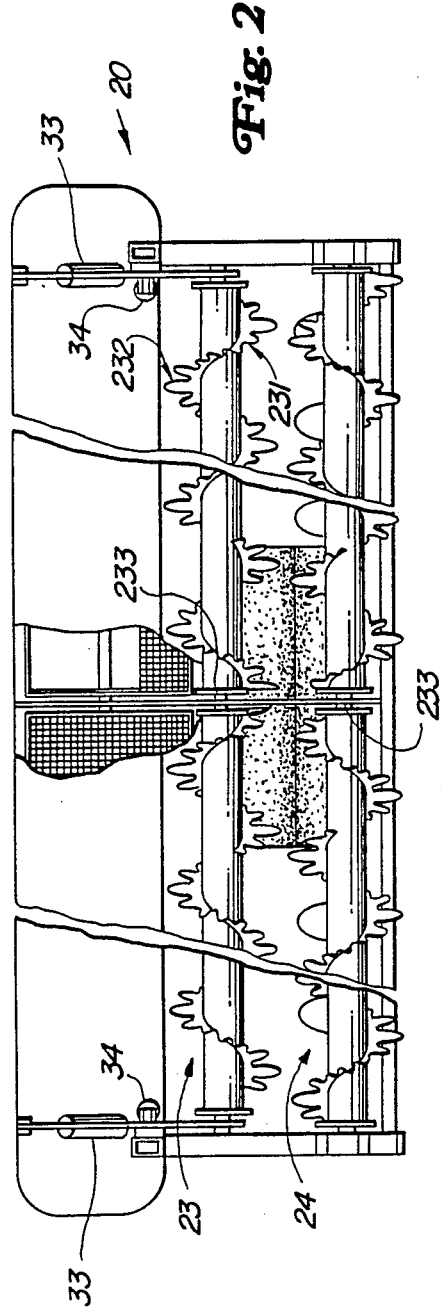
FIG. 2 is a front view of the invention illustrating the novel stripping mechanism of this invention.
Figure 3:
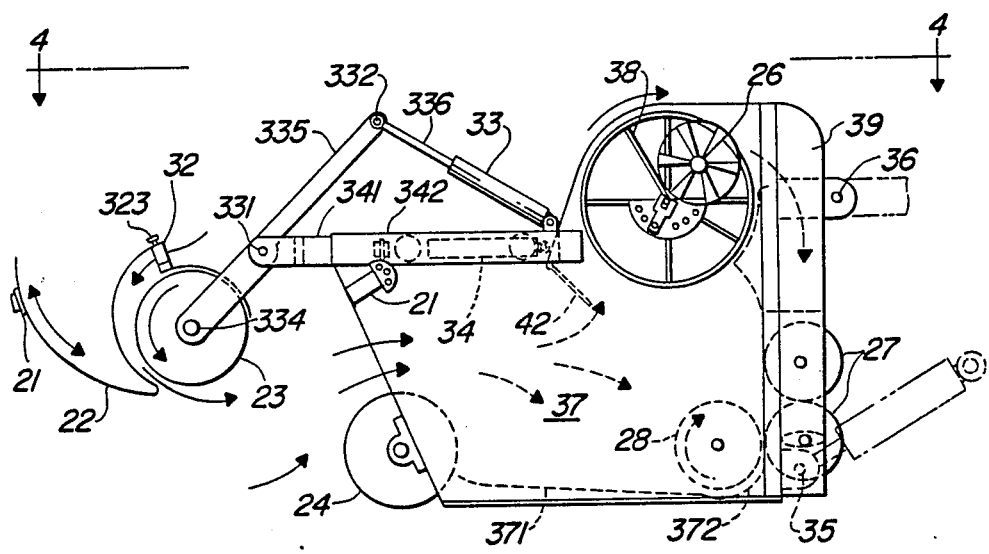
FIG. 3 is a detailed view of the separation and cleaning portions of the present invention.
Figure 9:
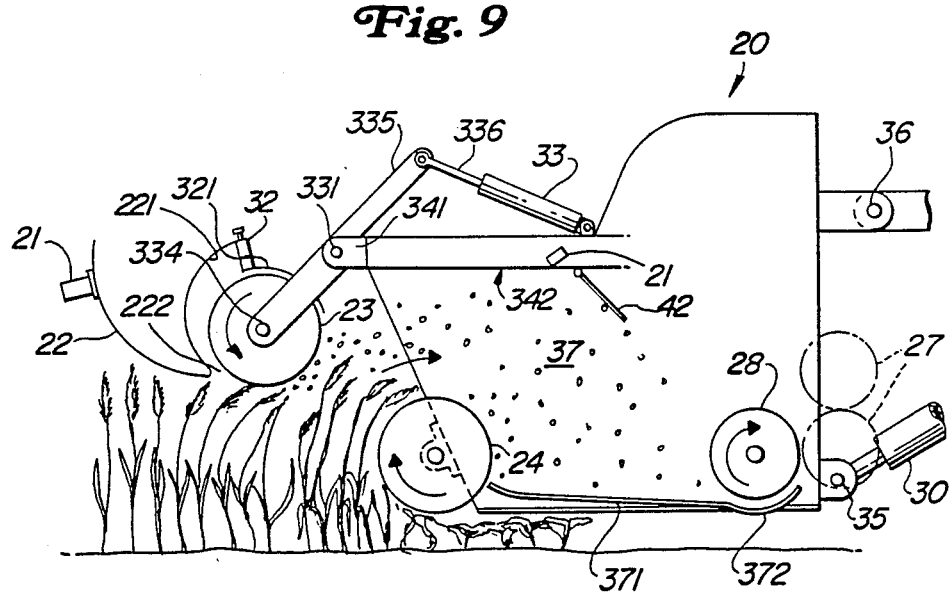
FIG. 9 is a schematic diagram illustrating the present invention stripping grain from short stalks.
Figure 10:
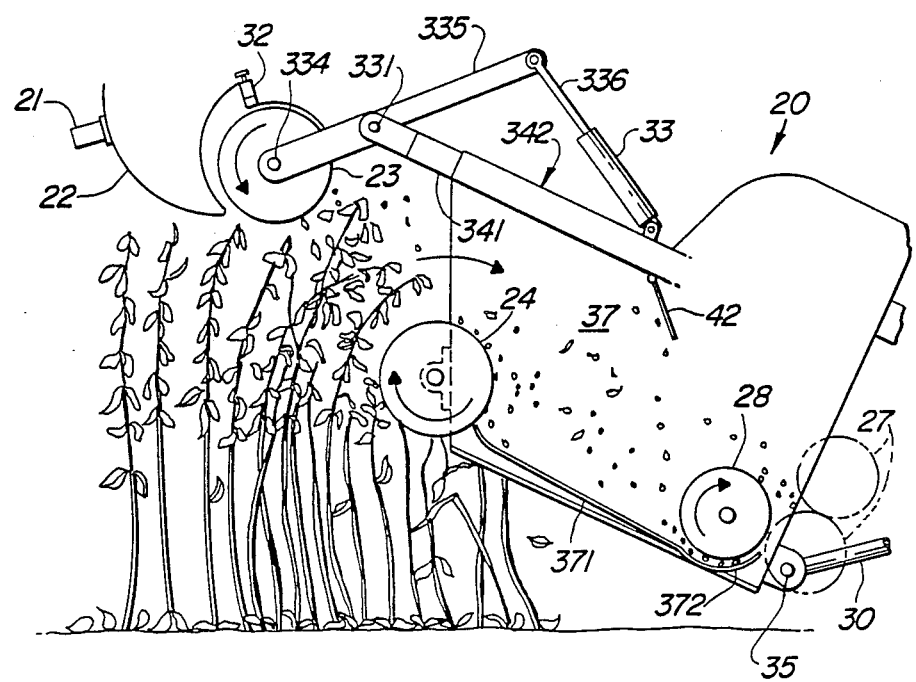
FIG. 10 is a schematic diagram illustrating the present invention stripping grain from tall stalks.

As illustrated, the mobile body (15) is shown with its propulsion system and may be of any desired mobile propulsion unit such as a tractor or a forage harvester or windrower as illustrated in FIG. 1. As schematically shown in FIG. 1, the mobile body and the combine header (20) are attached in the normal manner at (14). This mounting will permit vertical movement of the header for transport and for adjustment in the field. This is a normal mounting of a header and the details are not shown herein. The combine header includes of a sensor (21) mounted on the deflector shields or the adjustable shields (22). This sensor is preferably of the type described in my U.S. Pat. No. 4,507,910 and will continuously control the heighth of the header in response to the height of the crop over which the header is operating. Shield (22) is adjustable by means of the adjustment mechanism (32) to vary the air flow which is created between the shield and the stripping element by the rotation of the upper stripping element (23). By moving the shield (22) closer to the upper stripping element (23) a controlled increase in the amount of air flow can be generated if necessary to ensure the threshing action by the upper and lower stripping elements. Upper stripping element (23) is a split cylinder or auger mounted at the midpoint and at the sides of the header. The auger flighting is such that a reverse flow action is provided at the center of the harvester. This reverse flow aids in the stripping or percussion action and also creates the necessary air flow to prevent crop buildup at the center of the header. The novel elements of this auger and the flighting thereon are that the flighting has a plurality of v-sections cut into the flighting. These v-sections (232) are cut into the flighting (231) in order to improve the impact or percussion stripping of the grain from the stalk as well as providing a slot action which will perform a physical stripping if the percussion or impact has not loosened the grain from the stalk. The size and shape of the v-section may be varied to accommodate various crop requirements. Both stripping elements (23) and (24) are similarly constructed and the lower stripping element attacks the bottom of the heads of the grain in a manner similar to that of the upper stripping element. Grain having been removed from the heads is transported by the air flow created by the rotating motions of the stripping elements (23) and (24) and especially element (23). The air generated between the element (23) and the shield (22) moves the grain rearwardly into the chamber (37). It is to be noticed that the air flow around the upper stripping element (23) is designed to cause as much of the crop as possible to be forced onto the lower stripping element (24) to ensure total separation of the grain. The angle of operation and the heighth control is the function of the entire combine assembly but is essentially controlled by element (30) which is normally a hydraulic cylinder. This hydraulic cylinder causes the header to pivot about points (35) and (36) as best illustrated in FIGS. 9 and 10. The stripping action and the air flow are controlled as to position on the stalk by the distance measuring instruments (21) and the associated mini-computer connected thereto. The distance measuring instruments and the minicomputer must provide for an adjustable gate distance between the upper and the lower stripping elements. This adjustable gate distance is required in order to ensure that the stripping elements are positioned at the top of the head and at the bottom of the head of grain on the stalk. This gate distance is normally set into the mini-computer by the operator depending upon the average size of the grain head in the field. If the median distance is 10 inches from the ground for the heads then the gate may be set for 8–12 or any other number which will ensure that all heads are stripped by either the upper or lower element. The stripping function is the reverse of what you would normally expect from a study of the prior art, that is the lower or bottom stripping element performs the majority of the threshing or stripping of the grain. Any grain that is not collected or threshed by the bottom stripping unit is automatically forced into the top stripping element. This occurs when the air flow is overloaded, i.e., that it cannot push the grain down into the lower stripping element or when the density of the crop is such that the lower stripping element is overloaded. In this instance, the upper stripping element then will pick up the load and ensure that the crop is stripped. The upper stripping element has the capability of being adjusted up and down by the adjusting element (33). In addition, as shown in FIG. 3, the upper stripping element is capable of being adjusted horizontally (forward and aft) with the horizontal control means (34).

After the seeds or grain have been removed from the stalks and from the head, the (air flow) has passed the two stripping elements and (generated by the two stripping elements) propels the seeds or grain into the chamber (37). As the seeds are propelled by the air flow into the chamber (37), the fan (26) is creating a suction to aid the flow of the chaff from the chamber (37) up and around the drum (25). Drum (25) is a mesh rotating drum that applies a suction due to the rotation of fan (26) and the rotation of the drum (25). This suction assists in drawing air and materials other than the crop from the chamber collection area (37). The air pressure generated by the two stripping elements will now seek the lower pressure area on the suction cycle of the collection drum (25). This suction side comprises approximately one-half of the drum (25) which is utilized for chaff collection. In addition there is an air baffle (38) on the inside of the rotating collector drum (25). The baffle (38) is adjustable and in conjunction with the speed of the rotating mesh drum (25) determines the rate of material other than the crop which is to be collected on the rotating drum and subsequently blown off. As is noted, the air flow is pulled from the crop collecting area (37) to the rotating mesh drum (25) by the action of fan (26). When the rotating mesh drum rotates to the rear side, the fan (26) blows off or cleans the mesh on the rotating drum by blowing the material that was sucked on to the rotating drum on the forward side into the ground depositing vent system (39).

In addition, there is an adjustable deflector (42) which is positioned in the air flow in the chamber (37) to deflect solid or material such as the grain downward to the bottom of the chamber (37). The positioning of this deflector is important and is subject to variation as crop conditions change. It is designed and adjusted to permit the passage to the drum (25) of material other than grain and to ensure that the grain is deflected to the bottom of the chamber (37).

In addition, rapid travel of the threshing or combining elements may cause some crop heads to break off before the stripping or impact threshing has taken place. These whole or partially threshed heads must be threshed in order to ensure a total thresh. In order to accomplish this the heads being heavy will fall to the bottom of chamber (37) and be carried back to auger (28). Auger (28) will take the grain to the center of the combine unit and place them into the rotating brushes (27). The brushes are traveling at different peripheral speeds. The resulting differential peripheral speed between the brushes causes a scraping action on any unthreshed seed heads passing between the brushes and will thresh or remove the grain from the heads at such time. The two brushes can be adjusted so that the distance between the rotational actions of the two brushes can be varied for different crops. The momentum of the grain exiting from the brushes enters the venturi air flow chamber (41). The venturi action creates a suction on the grain as it enters this venturi chamber and helps to propel it to the grain transfer duct (17). The grain is propelled in transfer duct (17) the mobile grain tank by means of air from fan (29) as is best shown in FIG. 8.

Figure 4:
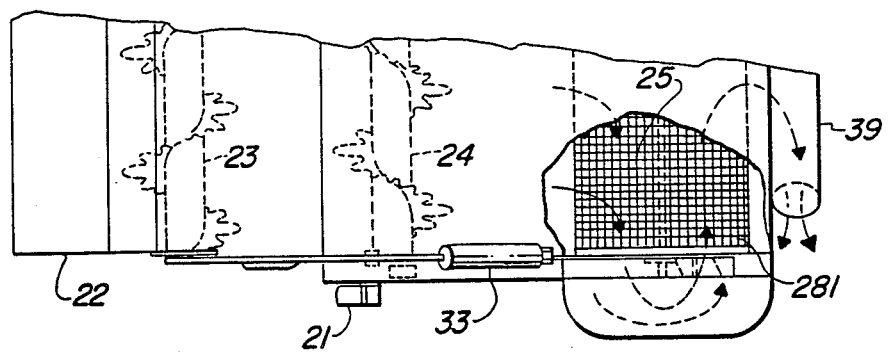
FIG. 4 is a cross section of FIG. 3 the plane of which is indicated by lines 4—4.
Figure 5:
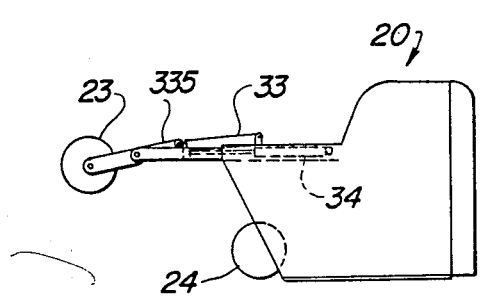
FIGS. 5 and 6 are simplified views of the header showing the relative position of the stripping mechanisms at both extreme positions.
Figure 6:
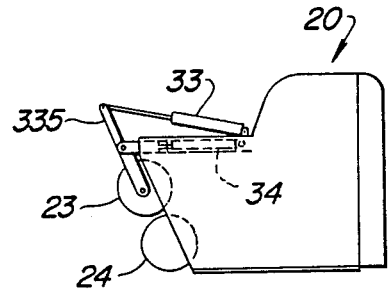
Figure 11:
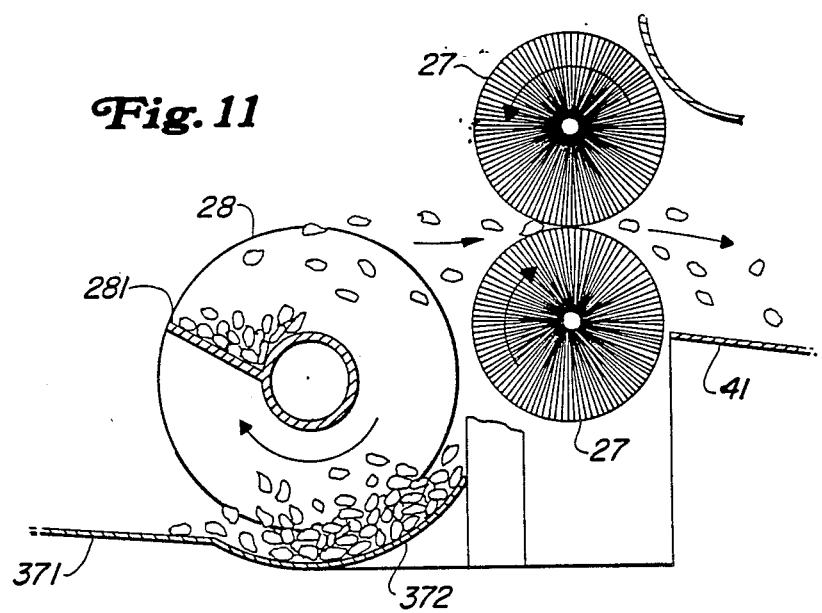
FIG. 11 is schematic view of the second separation system of the present invention.
Figure 12:
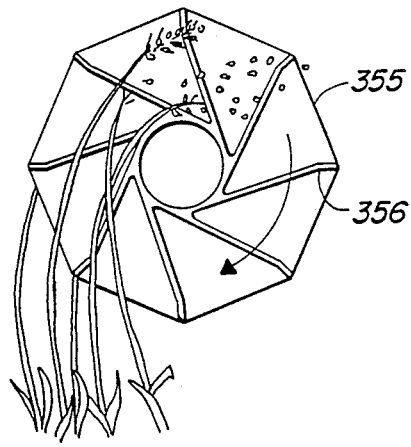
FIG. 12 is a schematic view of an alternative stripping mechanism which can be used in the present invention.

As the farmer or operator comes to the field, he will set the desired measured distance for the two sensors (21) to control the upper and lower limits of the control mechanism (33). The difference between these two readings is the predetermined gate value and as noted the positioning of the upper stripping element (23) will be controlled by the sensing elements (21) mounted on the shield and air flow generator (22). This monitor will detect the height of the crop and will determine the positioning of the upper stripping element. The second sensor (21) which is positioned as shown in FIG. 4 will measure the distance to the bottom of the grain head and as illustrated in FIG. 4, ensure that the upper portion of the lower stripping element (24) is positioned at approximately the bottom of the grain head. These controls or these sensors are provided with a microcomputer system not shown but which is readily within the state of the art to position the upper stripping element by means of the controls (33) and (34) at any position between that shown in FIG. 5 and that shown in FIG. 6. In addition, if it becomes necessary to change the level of operation of the combine header then the entire header unit may be tilted by means of the hydraulic cylinder (38) and points (35) and (36). This will enable the lower stripping element to be positioned as shown in FIG. 10. The lower stripping element may be raised to fit various crop heighths in addition to varying the position of the upper stripping element (23) with respect to the lower stripping element (24) to provide total stripping action only in the areas where the grain heads are occurring. These controls may be manual and the gate level set by the operator. A microprocessor can also be programmed to maintain a predetermined gate level between the upper stripping element (23) and the lower stripping element (24) as well as a predetermined height of the header to enable the stripping of any normally encountered grain. These stripping elements (23) and (24) are a pair of split augers having flighting thereon and where the flighting (232) has a plurality of v-shaped wedges cut into the periphery of the flighting. These v-shaped wedges will provide impact separation of the grain from the header as well as a stripping action when the stalk and the head reach the small point of the groove (232). As the crop varies it may also be necessary to vary the position of the shield (22) with respect to the upper stripping element (23). The air flow channel created by the inner surface (221) of the shield (22) and the exterior surface of the flighting of the upper stripping element may be varied by changing the control element (32). By increasing or decreasing the distance between the intake area of the air and the exhaust position (222), it is possible to control the air flow to ensure that the grain heads are properly threshed. Combination of the rotation of the two stripping elements and the air flow effect controlled by the shield (22) will force the heads into contact with the lower stripping element (24) whereby the grain is removed from the heads. Best illustrated in either FIG. 9 or 10 as the air flow is blowing the heads, it forces them toward the lower stripping element. However, when the air flow is insufficient because of heavy crop or other reasons to force the grain into the lower stripping element the upper stripping element will automatically come into play and strip the heads of the grain. The forward motion of the entire threshing unit must be controlled so that the rotational speed of the two stripping elements will have time to operate before the next group of heads is encountered. It is to be noted that the two stripping elements are split at the middle and thus rotational action of these two stripping elements will have a reverse flow stripping action at the center of the harvesting machine where other bearings (233) are positioned. As can be seen, the angle of operation as well as the height control of the entire combine assembly is facilitated by the movement of cylinder (30). This action as shown in FIGS. 9 and 10 two different levels permits any combination of positions that will thresh the grain from almost ground level to the top of the highest normal crop. The lower stripping element (24) is normally positioned to strike the stalk of the crop at the base of the seed head with sufficient velocity to cause disruption of the seeds in their natural bedding and remove the crop head and seeds and project. These removed seeds are projected into the chamber (37) and fall to the pan (371) and are carried by their momentum back into the collection area (372) where they are carried to the center of the combine element by auger (28) and as shown in FIG. 11. At the center point of auger (28) the flighting is discontinued and a straight element (281) is placed on the auger. This element will lift the seeds from the collection area (372) to pass between the brushes (27). The force on the grain and the rotational velocity of the brushes will carry the grain through the brushes into the chamber (41) for passage to the delivery duct (17).

At the same time that the grain has been following the above-described passage, the air flow has been removing from the grain, the chaff and other elements of the threshing system which are undesirable. The air flow generated by the rotational velocity and the constrictions formed by shield (22) passes into the chamber (37). If some grain as shown in FIG. 10 has been projected rearwardly with sufficient force that it could be carried into the cleaning system, it is deflected by adjustable baffle (42). The adjustment means for baffle (42) is not shown, however, any known method of fixing a plate in different spatial positions would be operable.

The chaff collector or material other than grain collector (25), is a mesh rotating drum that provides a suction for drawing the air from the collection chamber (37).

Features and advantages other than those pointed out herein will become apparent to those versed in the art, as will many modifications in and additions to the preferred embodiment disclosed, all without departure from the spirit and scope of the invention.

What is claimed is:

1. A grain harvester comprising a wheeled frame adapted to be advanced in a field in a predetermined direction; a header mounted to said wheeled frame; a first drum mounted on said header for rotation about a horizontal axis transverse to said direction of travel; said drum including means for stripping the grain including the heads from the stalks; means for rotating said first drum as said harvester advances; means for varying the rotational speed of said first drum; a second drum rotatably mounted on said frame for rotation about the horizontal axis transverse to the direction of travel; means for rotating said second drum; shield means surrounding a portion of said first drum to generate air flow between the inner surface of said shield means and said first drum when said first drum is rotated; at least one sensor means for sensing a first point at the top of the grain to measure the distance said first drum is above the crop stalks to be harvested; a second sensor means for sensing the distance from said first sensor means to a second point on said crop stalks; means for adjusting said harvesting means to maintain predetermined differential between the distances measured by the first and second sensors; a separation chamber receiving on one side the air flow generated by the rotation of the first drum means and the loose grain removed from said stalk by the action of said first and second drum means; means for generating a suction on a second side of said separation chamber; means for creating said suction comprising a fan means having its input side connected to said chamber means; a third rotating drum surrounding said fan means; means for adjusting the amount of each of said air flows on said third drum; discharge means for discharging the material other than grain after removal from the third rotating drum by the pressure of the fan; collection means for collecting and holding the grain after separation; means for moving the grain collected in said collection means to the center of said means; means at the center of the chamber and said collection means for expelling the grain from the collection area; a second means for separating the grain from the heads connected to said collection means, said second separating means including a plurality of rotating brushes; means for independently driving the brushes at variable speeds resulting variable differential peripheral velocities; means for carrying the grain from said second separation means to a receptacle.

2. The grain harvester of claim 1 further characterized by means for adjusting said first drum vertically.

3. The grain harvester of claim 1 further characterized by means for adjusting said first drum vertically; and means for adjusting said first drum horizontally.

4. The grain harvester of claim 1 further characterized by means for adjusting said first drum vertically; and means for adjusting said second drum vertically.

5. The grain harvester of claim 1 further characterized by means for adjusting said first drum vertically; means for adjusting said first drum horizontally; and means for adjusting said second drum vertically.

6. The grain harvester of claim 1 further characterized by said shield means adjustable with respect to distance from said first drum to control or regulate the amount of air flow.

7. The grain harvester of claim 1 further characterized by means for adjusting said first drum vertically; and said shield means adjustable with respect to distance from said first drum to control or regulate the amount of air flow.

8. The grain harvester of claim 1 further characterized by means for adjusting said first drum vertically; means for adjusting said first drum horizontally; and said shield means being adjustable with respect to distance from said drum means to control or regulate the amount of air flow.

9. The grain harvester of claim 1 further characterized by means for adjusting said first drum vertically; means for adjusting said first drum horizontally; means for adjusting said second drum vertically; and said shield means being adjustable with respect to distance from said drum means to control or regulate the amount of air flow.

10. The grain harvester of claim 1 further characterized by said first sensor means mounted on said shield.

11. The grain harvester of claim 1 further characterized by means for adjusting said first drum vertically; means for adjusting said first drum horizontally; and said first sensor means mounted on said shield.

12. The grain harvester of claim 1 further characterized by means for adjusting said first drum vertically; means for adjusting said first drum horizontally; means for adjusting said second drum vertically; and said first sensor means mounted on said shield.

13. The grain harvester of claim 1 further characterized by means for adjusting said first drum vertically; means for adjusting said first drum horizontally; means for adjusting said second drum vertically; said shield means adjustable with respect to distance from said first drum means to control or regulate the amount of air flow; and said first sensor means mounted on said shield.

14. The grain harvester of claim 1 further characterized by a baffle means in said separation means to ensure that the grain remains in the separation chamber.

15. The grain harvester of claim 1 further characterized by a baffle means in said separation chamber to ensure that the grain remains in the separation chamber; and said baffle means being adjustable.

16. The grain harvester of claim 1 further characterized by means for adjusting said first drum vertically; means for adjusting said first drum horizontally; and a baffle means in said separation chamber to ensure that the grain remains in the separation chamber.

17. The grain harvester of claim 1 further characterized by means for adjusting said first drum vertically; means for adjusting said first drum horizontally; and a baffle means in said separation chamber to ensure that the grain remains in the separation chamber; and said baffle means being adjustable.

18. The grain harvester of claim 1 further characterized by means for adjusting said first drum vertically; means for adjusting said first drum horizontally; and said shield means adjustable with respect to distance from said drum means to control or regulate the amount of air flow; and a baffle means in said separation chamber to ensure that the grain remains in the separation chamber.

19. The grain harvester of claim 1 further characterized by means for adjusting said first drum vertically; means for adjusting said first drum horizontally; and said shield means adjustable with respect to distance from said first drum to regulate the amount of air flow; and a baffle means in said separation chamber to ensure that the grain remains in the separation chamber; and said baffle means being adjustable.

20. The grain harvester of claim 1 further characterized by means for adjusting said first drum vertically; means for adjusting said first drum horizontally; and said shield means adjustable with respect to distance from said first drum means to regulate the amount of air flow; said sensor means mounted on said shield; and a baffle means in said separation chamber to ensure that the grain remains in the separation chamber.

21. The grain harvester of claim 1 further characterized by means for adjusting said first drum vertically; means for adjusting said first drum horizontally; and said shield means adjustable with respect to distance from said first drum means to regulate the amount of air flow; said sensor means mounted on said shield; a baffle means in said separation chamber to ensure that the grain remains in the separation chamber; and said baffle means being adjustable.

22. The grain harvester of claim 1 further characterized by means for adjusting the amount of each of said air flows on said third drum.

23. The grain harvester of claim 18 further characterized by means for adjusting the amount of each of said air flows on said third drum.

24. The grain harvester of claim 19 further characterized by means for adjusting the amount of each of said air flows on said third drum.

25. The grain harvester of claim 20 further characterized by means for adjusting the amount of each of said air flows on said third drum.

26. The grain harvester of claim 21 further characterized by means for adjusting the amount of each of said air flows on said third drum.

27. The grain harvester of claim 1 further characterized by said collection chamber including a pan at the bottom of the separation chamber.

28. The grain harvester of claim 22 further characterized by said collection chamber including a pan at the bottom of the separation chamber.

29. The grain harvester of claim 19 further characterized by said collection chamber including a pan at the bottom of the separation chamber.

30. The grain harvester of claim 20 further characterized by said collection chamber including a pan at the bottom of the separation chamber.

31. The grain harvester of claim 21 further characterized by said collection chamber including a pan at the bottom of the separation chamber.

32. The grain harvester of claim 26 further characterized by said collection chamber including a pan at the bottom of the separation chamber.

33. The grain harvester of claim 27 further characterized by means for concentrating the separated grain at the rear of said pan.

34. The grain harvester of claim 28 further characterized by means for concentrating the separated grain at the rear of said pan.

35. The grain harvester of claim 29 further characterized by means for concentrating the separated grain at the rear of said pan.

36. The grain harvester of claim 30 further characterized by means for concentrating the separated grain at the rear of said pan.

37. The grain harvester of claim 1 further characterized by said means for moving said grain in said pan comprising an auger.

38. The grain harvester of claim 22 further characterized by said means for moving said grain in said pan comprising an auger.

39. The grain harvester of claim 32 further characterized by said means for moving said grain in said pan comprising an auger.

40. The grain harvester of claim 1 further characterized by said rotating brushes being adjustable vertically.

41. The grain harvester of claim 21 further characterized by said rotating brushes being adjustable vertically.

42. The grain harvester of claim 22 further characterized by said rotating brushes being adjustable vertically.

43. The grain harvester of claim 37 further characterized by said rotating brushes being adjustable vertically.

* * * * *